United States Patent [19]

Graber

[11] 4,318,501
[45] Mar. 9, 1982

[54] BUMPER MOUNTED CARRIER RACK

[76] Inventor: Joseph V. Graber, 3739 County Trunk M, Middleton, Wis. 53562

[21] Appl. No.: 182,450

[22] Filed: Aug. 29, 1980

[51] Int. Cl.³ .............................. B60R 9/06; B60R 9/10
[52] U.S. Cl. ......................... 224/42.03 R; 24/230.5 R; 24/243 B; 211/17; 224/42.03 B; 248/225.3 R; 280/502; 411/400
[58] Field of Search ................. 224/42.03 R, 42.03 A, 224/42.03 B, 42.07; 280/402, 502; 248/225.3, 227, 65, 70, 228, 229; 211/17, 18, 22; 24/230.5 R, 243 B; 411/400

[56] References Cited

U.S. PATENT DOCUMENTS

| 1,564,703 | 12/1925 | Nichols | 224/42.03 A X |
| 2,101,622 | 12/1937 | Milligan | 280/502 |
| 2,512,267 | 6/1950 | Donnelley | . |
| 2,642,295 | 6/1953 | Riemann | 280/502 |
| 3,013,754 | 12/1961 | Hastings | 224/42.03 A X |
| 3,841,544 | 10/1974 | Berger | . |
| 4,040,498 | 8/1977 | Johnson et al. | . |
| 4,050,616 | 9/1977 | Mosow | . |

FOREIGN PATENT DOCUMENTS 465530  5/1950  Canada ................................ 280/502

OTHER PUBLICATIONS

Sears Owners Manual for Lift Off Bicycle Carrier Model No. 712.48558 (4 pp.).
Instruction Sheet Mijon Imperial Bike Carrier (1 sheet—No. BC6001-AIS-1).

Primary Examiner—Allan N. Shoap
Attorney, Agent, or Firm—Vernon J. Pillote

[57] ABSTRACT

A bumper mounted carrier rack of the type having spaced downwardly extending rack legs on the bumper of a vehicle. The carrier rack is detachably mounted on the vehicle bumper by bumper mounting brackets which include tubular posts dimensioned to receive the legs of the carrier rack. The tubular posts have an outwardly flared leg on their upper end and are clamped to the bumper by a bumper clamp having an opening for receiving the post and arranged to underlie the lip to support the post at a level closely adjacent the top of the bumper. Bumper hangers secure the bumper clamp and posts to the bumper. In one embodiment, the bumper hangers are provided with multiple purpose hooks for use on flange type as well as flangeless bumpers. In another embodiment, bumper engaging hangers are provided for use on box type bumpers as well as covered bumpers.

7 Claims, 10 Drawing Figures

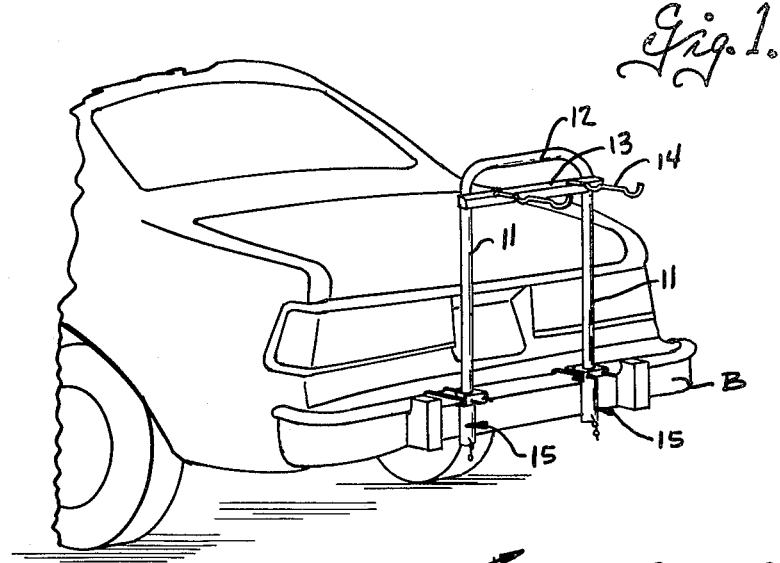
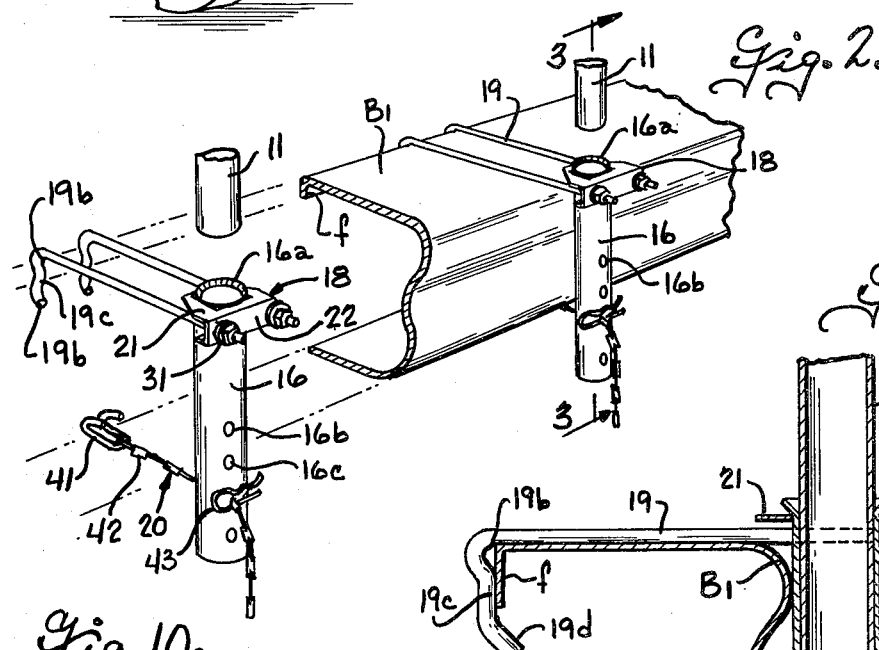
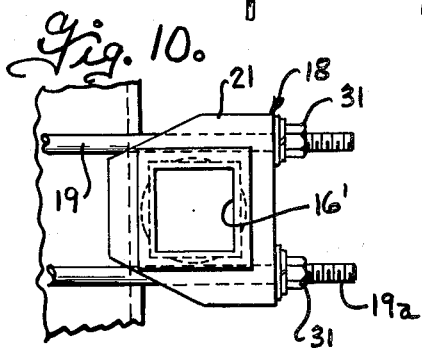
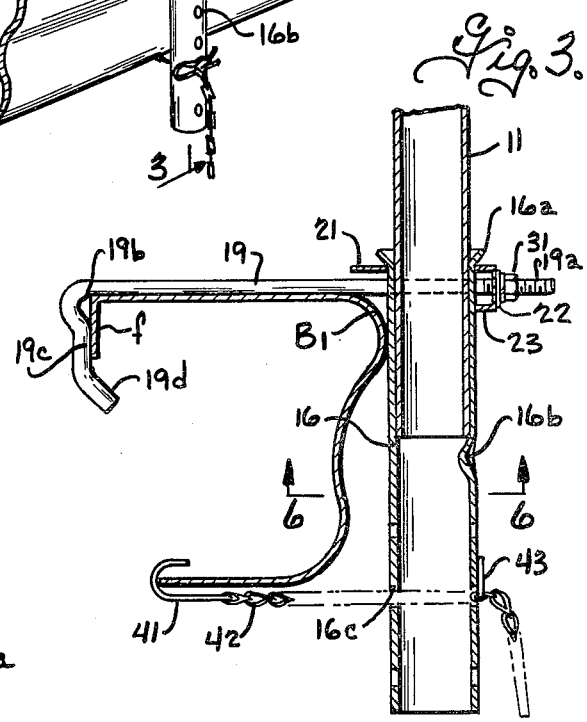

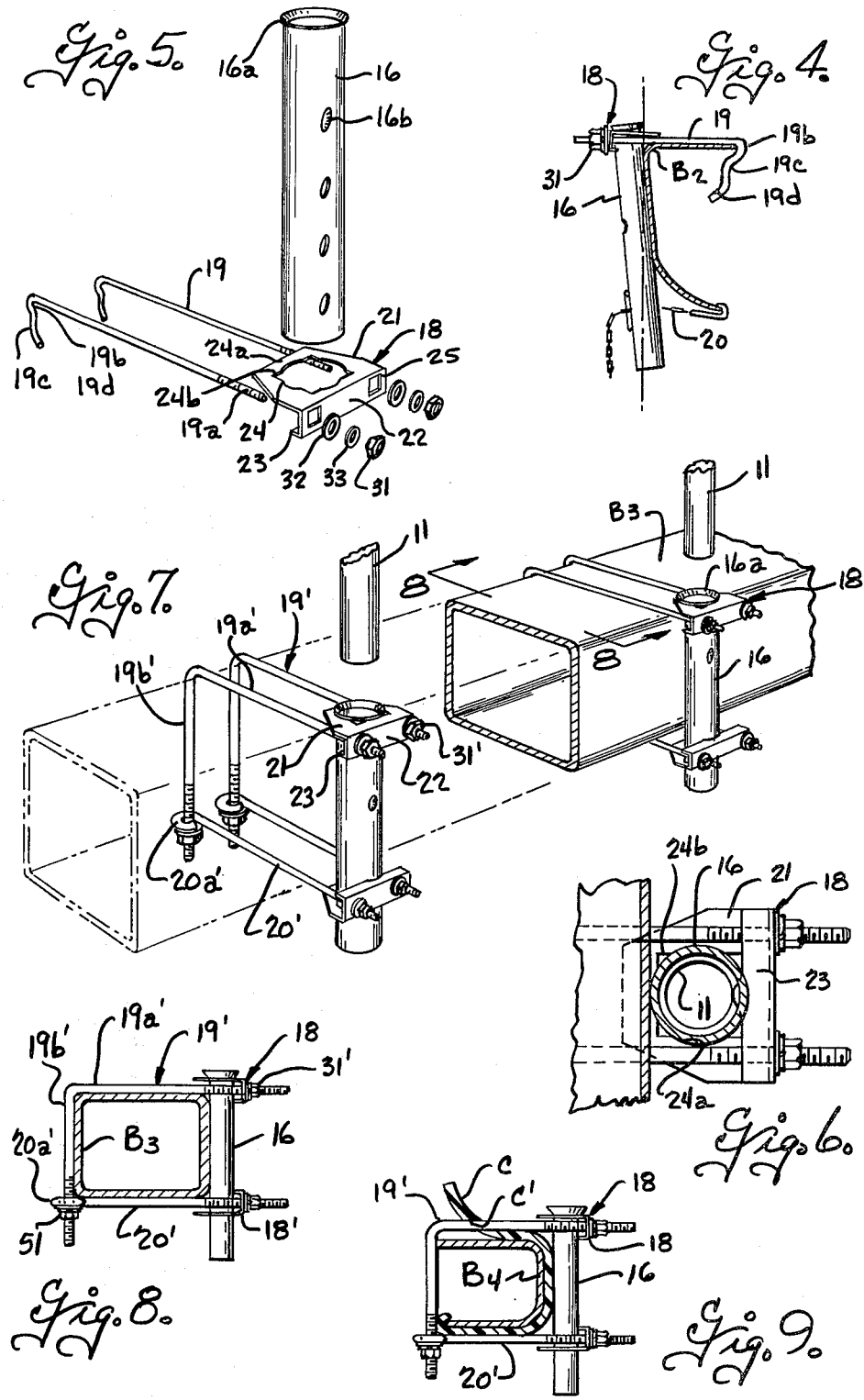

BUMPER MOUNTED CARRIER RACK

BACKGROUND OF THE INVENTION

Automobile bicycle carrier racks have heretofore been made which support a bicycle on the bumper at the rear end of a vehicle with the bicycle extending generally crosswise of the vehicle. A common form of bicycle carrier rack has laterally spaced frame members supported at their lower ends on the vehicle bumper to extend generally upright, and spaced bicycle support members adjacent the upper end of the carrier rack for engaging and supporting one or more bicycles. Such carrier racks frequently interfere with use of the trunk lid, hatchback cover or station wagon door when they are mounted on the bumper. In order to facilitate removal of the carrier rack without requiring removal of the bumper fittings, bumper mounted carrier racks have heretofore been made which provide bumper mounting brackets that are mounted on the bumper and which detachably receive the lower ends of the legs of the carrier rack. However, some trunk lids and station wagon doors have very little clearance above the top of the bumper and it is important that the tops of the bumper brackets be disposed substantially flush with the top of the bumper, in order to avoid interference with the trunk lid or station wagon door, when the carrier rack is removed. Further, the type, size, and shape of the bumpers varies widely on different vehicles, and it is desirable to provide bumper mounting brackets capable of accommodating bumpers of different type, size and shape.

An important object of the present invention is to provide, in a bumper mounted carrier of the type having a pair of laterally spaced downwardly extending rack legs, a pair of bumper mounting brackets for detachably mounting the carrier rack on the bumper and which bumper mounting brackets are disposed substantially flush with the top of the bumper, to avoid interference with a trunk lid or a staton wagon door, when the carrier rack is removed from the bumper mounting brackets.

Another object of this invention is to provide bumper mounting brackets which can be mounted on bumpers of widely different type, size and shape.

Still another object of this invention is to provide a bumper mounting bracket which can be economically manufactured and easily installed on vehicle bumpers, and which are rugged and durable in use.

These, together with other objects and advantages of this invention will be more readily understood by reference to the following detailed description when taken in connection with the accompanying drawings wherein:

FIG. 1 is a fragmentary perspective view of the rear portion of a vehicle having a bumper mounted carrier rack mounted thereon;

FIG. 2 is a fragmentary exploded view of vehicle bumper and the bumper mounting rack;

FIG. 3 is a transverse sectional view through a vehicle bumper and bumper mounting rack taken on the plane 3—3 of FIG. 2;

FIG. 4 is a transverse sectional view through a modified form of vehicle bumper having the bumper mounted rack mounted thereon;

FIG. 5 is a fragmentary vertical sectional view illustrating the bumper mounting bracket mounted on a bumper of different form from that shown in FIG. 3;

FIG. 6 is a fragmentary horizontal sectional view taken on the plane 6—6 of FIG. 3;

FIG. 7 is a fragmentary perspective view of a modified form of bumper having a modified bumper mounting bracket applied thereto;

FIG. 8 is a vertical sectional view taken on the plane 8—8 of FIG. 7;

FIG. 9 is a fragmentary vertical sectional view illustrating the bumper mounting bracket of FIG. 7 applied to a modified form of bumper; and FIG. 10 is a fragmentary horizontal sectional view illustrating a further modified form of bumper mounting bracket.

The present invention relates to bumper mounted carrier racks and particularly bumper mounted carrier racks of a type having a pair of laterally spaced downwardly extending rack legs and which are adapted to support one or more bicycles at the rear of the vehicle. As shown in FIG. 1, the carrier rack 10 includes a frame structure having a pair of laterally spaced legs 11 which are interconnected as by cross members 12 and 13, and which have bicycle support arms 14 mounted thereon for supporting the bicycles. The arms are mounted so as to extend rearwardly of the rack when the carrier rack is in use, to engage and support one or more bicycles, and the arms are preferably mounted for swinging movement from their support position shown in FIG. 1 to a position paralleling the frame of the carrier rack to provide compact storage when not in use.

Bumper mounting brackets 15 are provided for detachably mounting the carrier rack on the bumper B of a vehicle to enable removal of the carrier rack without removing the bumper fittings. The carrier racks are used on a wide variety of different types of vehicles including sedans, station wagons, and recreational vehicles, and the bumper mounting brackets are constructed and arranged so as to be disposed substantially flush with the top of the bumper, when the carrier rack is removed, so that the brackets do not interfere with movement of the trunk lid or rear station wagon door between its open and close positions. A pair of bumper mounting brackets are provided, one for each of the upright legs 11 of the carrier rack, and each bumper mounting bracket includes a tubular post 16 having an internal dimension to slidably receive the lower end of a respective rack leg 11. The tubular posts 16 each have a flared lip 16a on their upper end and an internal stop means 16b spaced below the upper end of the post a distance at least several times greater than the cross section of the post to limit downward movement of the leg 11 of the carrier rack. As best shown in FIG. 3, the internal stop means 16b conveniently comprises a depression formed in the side of the tubular posts 16.

The tubular posts 16 are adapted to extend alongside the rear of the vehicle bumper B and means including bumper post clamps 18 and upper and lower bumper hangers 19 and 20 are provided for securing the posts to the bumper. The bumper post clamps 18 comprise a unitary sheet metal body having a plate portion 21, a flange portion 22 extending transverse to the plate portion along one side edge, and a lip portion 23 extending laterally from the flange portion and in spaced relation to the plate portion. The plate portion has a hole 24 formed therein of a size to receive a tubular bumper post, but smaller than the outer diameter of the lip 16a on the post so as to underlie and support the lip on the post. As best shown in FIG. 5, the bumper post clamps each have a pair of spaced bolt receiving openings 25 spaced apart a distance greater than the cross section of the hole 24, and the lip 23 on the clamp 18 is arranged to extend from the flange a distance to engage the side wall of the tubular post, as clearly shown in FIG. 3.

The bumper hangers 19 secure the bumper post clamps 18 to the bumper B and, as shown in FIGS. 1–6, the bumper hangers 19 include an elongated shank having an externally threaded end portion 19a at one end that extends through a respective one of bolt holes 25 in the bumper post clamp, and a hook portion at the other end engageable with the upper forward edge of the bumper. Some bumpers such as designated $B_1$ in FIGS. 2 and 3, have a depending flange designated f along their forward edge, while others such as shown at $B_2$ in FIG. 4 have a flangeless forward edge. In accordance with the present invention, the hook portion on the bumper hangers is constructed and arranged so that the same hangers can be utilized with the flangeless bumpers shown in FIG. 4 as well as the flange-type bumpers as shown in FIGS. 2 and 3. For this purpose, the bumper hangers are provided with a first reversely curved hook portion 19b that is integral with the end of the shank and defines an acute included angle with the shank, for engaging the edge of a flangeless bumper such as designated $B_2$ in FIG. 4. The bumper hangers are also provided with a second hook portion 19c which is integral with the distal end of the first hook portion 19b and extends therefrom in a direction generally perpendicular to the shank portion 19, for engaging the flange f on the forward edge of a flange type bumper such as shown at $B_1$ in FIGS. 2 and 3. The hooks on the bumper engaging hangers are also provided with a third hook portion 19d that is integral with the distal end of the second hook portion 19c, and extends therefrom at an acute angle to the shank portion of the hook, to extend downwardly and forwardly in underlying relation to the flange f on a flange type bumper. Preferably, the reversely curved hook portion 19b and the hook portion 19d each define an included angle of about 45° with the shank of the bumper engaging hook. The bumper hangers can be easily installed in overlying relation to the top of the bumper by turning the hook portions 19b-19d to a generally horizontal plane while sliding the hangers forwardly over the top of the bumper, and then turning the bumper hangers so that the hook portions extend downwardly to engage the forward edge of the bumper, as shown in FIGS. 3 and 4. Nuts 31 are threaded on the externally threaded end portions 19a of the bumper hangers and, as best shown in FIG. 5, a flat washer 32 and lock washer 33 are interposed between the nut and the flange portion of the bumper clamp. As will be seen, the nuts 31 can be tightened to draw the bumper post clamp forwardly and press the tubular posts 16 against the rear face of the bumper. When installed, the bumper engaging hangers overlie the top of the bumper and the plate portion 21 of the bumper post clamp underlies the lip 16a on the upper end of the tubular bumper post 16 to support the same. The plate 21 is very rigid in a plane paralleling the lengthwise axis of the bumper hangers 19 and the bumper post is firmly clamped by the plate portion 21 and lip 23 against the rear face of the bumper.

In the embodiment shown in FIGS. 1–6, the lower bumper hanger 20 includes a hook member 41 attached to one end of a flexible chain 42, the other end of which chain is extended through selected ones of vertically spaced pairs of aligned openings 16c in the lower portion of the tubular posts 16 and anchored to the posts by a retainer pin 43. As best shown in FIG. 2, the hook 41 comprises a U-shaped wire member having hook portions at opposite ends disposed in a plane perpendicular to the plane of the U-shaped wire member. During installation, the retainer pin 43 is inserted through the chain 42 at the rear side of the post at a location to support the bumper post in a generally upright position, and the nuts 31 on the upper bumper hangers thereafter tightened to clamp the bumper posts 16 to the bumper.

The legs 11 of some of the carrier racks are formed of round tubular stock, such as 1⅛" round tubing, while the legs of some other carrier racks are formed of square stock, such as 1" square tubing. In order to adapt the bumper mounting posts for use with carrier racks having either round or square tubing, the opening 24 in the bumper clamps 18 is formed so as to receive tubular posts of either round cross section or square cross section. Carrier racks having tubular legs of 1⅛" round cross section can be received in round tubular posts having an outer diameter of about 1¼", while tubular carrier legs having a 1" square cross section can be received in square tubular posts having an outer width of about 1⅛". As best shown in FIG. 6, the opening 24 in the plate portion of the bumper clamps is formed so as to include a plurality of arcuately spaced arc segments 24a which define portions of a circle dimensioned to receive a tubular bumper post 16 of circular cross section as shown in FIGS. 1–6, and the hole also includes a plurality of notches 24b located angularly intermediate adjacent ones of the arc segments and defining corners of a square to receive tubular bumper posts 16' of square cross section as shown in FIG. 10. The arc segments 24a may, for example, define portions of a circle of a diameter slightly greater than 1¼" to receive a tubular bumper post of about 1¼" o.d., and the notches 24b can define portions of a square that is slightly greater than 1⅛" on each side to receive a tubular bumper post of square cross section. As will be seen, the width dimension of the square bumper posts is less than the diameter of the circular bumper posts, but the diagonal dimension of the square posts is greater than the diameter of the circular posts.

Some vehicle bumpers, such as those used on some recreational vehicles have a box shaped cross section such as shown at $B_3$ in FIG. 7 and do not provide a lip or a flange which can be engaged by hook-type bumper engaging hangers. Some other bumpers are in at least substantially enclosed in a heavy plastic or rubber covering, for example as shown in FIG. 10 and designated $B_4$. In the embodiment of FIGS. 8–10, the bumper posts 16 and the upper bumper clamps 18 are conveniently of the same construction as previously described in connection with FIGS. 1–7, and like numerals are used to designate corresponding parts. In this embodiment, modified upper bumper hangers 19' and modified lower bumper hangers 20' are provided. The upper bumper hangers comprise a pair of generally L-shaped bolts having first and second legs 19a' and 19b' integrally connected at one end to extend transverse to each other and having threaded end portions. The lower bumper hangers comprising eye bolts having an eye 20a' at one end dimensioned to receive one of the legs of the upper bumper hook, and a threaded end portion at its other end. One leg 19a'' of each of the upper bumper hangers extends through respective ones of the bolt receiving openings 25 in an upper bumper clamp 18 and has threaded fasteners 31' thereon for adjusting the upper bump clamp horizontally. The threaded end portions on the legs 19b' of the upper bumper hangers extend downwardly through the eyes 20a' on the lower bumper hangers and have threaded fasteners 51 thereon for adjusting the lower bumper hangers vertically. The threaded ends of the eye bolts 20' extend through bolt openings in the flange of a lower bumper clamp 18', conveniently of the same form as the upper bumper clamp 18, and have threaded fasteners 52 thereon for adjusting the lower bumper clamp 18' horizontally. When the bumper brackets are installed on the bumper as shown in FIGS. 8 and 9, the tubular bumper posts 16 extend alongside the rear face of the bumper and the L-shaped bolts 19' extend along the top and rear sides of the bumper while the lower eye bolts 20' extend along the underside of the bumper. The position of the lower eye bolts on the upright legs 19' can be vertically adjusted by the nuts 51' to accommodate bumpers of different height, and the lower bumper clamp 18' is vertically adjustable along the tubular bumper posts 16 so that the lower eye bolts can closely underlie the bottom of the bumper. The nuts 31' and 52' adjust the upper and lower bumper clamps 18 and 18' in a horizontal direction to adapt the bumper mounting bracket for bumpers of different widths.

The same bumper hangers 19' and 20' can be utilized on covered bumpers, that is bumpers as shown at B4 in FIG. 9 that are covered by a heavy plastic or rubber covering C that extends over the top, rear end bottom of the bumper. When used on such bumpers, it is only necessary to drill a pair of small holes C' in the covering C closely adjacent the top of the bumper and at locations along the length of the bumper where it is desired to position the bumper mounting brackets. The leg 19b' of the L-shaped bolt 19' can be inserted through the opening C' and the leg 19b' then swung downwardly at the rear side of the bumper. The lower eye bolts 20' are then assembled on the upper and lower clamps 18 and 18' and bumper posts 16, in the manner previously described in connecton with FIGS. 8 and 9.

From the foregoing it will be seen that the bumper mounting brackets are adapted to removably support the carrier rack on the rear bumper of a vehicle and that the bumper mounting brackets, when mounted by either bumper hangers 19, 20 or 19', 20' are disposed substantially flush with the top of the bumper so that they do not obstruct either the trunk lid or the rear station wagon door, when the carrier rack is removed. Bumper hangers 19 are adapted for use on a wide variety of bumpers including flangeless bumpers as well as flange-type bumpers. Bumper engaging hangers 19' and 20' are adapted for use with box type bumpers or covered bumpers as shown in FIGS. 8-10, and can accommodate bumpers of widely different height and width. Moreover, the bumper clamps are constructed and arranged so that they can be utilized with tubular posts of either circular cross section or square cross section to respectively accommodate carrier racks formed of circular tubing or square tubing.

The embodiments of the invention in which an exclusive property or privilege is claimed are defined as follows:

1. In a bumper mounted carrier rack of the type having a pair of laterally spaced downwardly extending rack legs, a pair of flush mounted bumper brackets for detachably mounting the rack on a bumper, each bumper bracket comprising:

(a) a tubular bumper post having an internal dimension to slidably receive the lower end portion of a respective rack leg and an outwardly flared lip at its upper end, (b) a bumper post clamp including an upper plate portion having a bumper post receiving hole dimensioned to receive a tubular bumper post with the lip overlying the plate portion for support thereon, the post clamp having a flange portion extending transverse to the plate portion along one edge of the latter and a lip portion extending laterally from the flange portion below the plate portion for engaging the side of a bumper post, the flange portion having a pair of bolt receiving openings adjacent relatively opposite sides of the hole in the plate portion, (c) a pair of bumper hangers each having an elongated shank with a transversely extending bumper engaging means at one end and a threaded portion on the other end adapted to extend through respective ones of the bolt receiving openings in the flange at relatively opposite sides of the bumper post, and nut means threaded on the threaded portions of the shanks to draw the bumper post clamp against the bumper posts.

2. The combination of claim 1 wherein said hole in said plate portion includes a plurality of arc segments defining portions of a circle of a diameter to receive a tubular bumper post of circular cross section and a plurality of notches angularly intermediate adjacent ones of the arc segments and defining the corners of a square having a width dimension smaller than the diameter of said circle and a diagonal dimension greater than the diameter of said circle for receiving a tubular bumper post of square cross section.

3. The combination of claim 2 wherein said bumper engaging means of the bumper hanger includes a first reversely curved hook portion integral with said one end of each shank and defining an acute included angle therewith for engaging the edge of a flangless bumper; a second hook portion integral with the distal end of the first hook portion and extending therefrom in a direction generally perpendicular to the shank, and a third hook portion integral with the distal end of the second hook portion and extending therefrom in a direction at an acute included angle with the shank portion.

4. The combination of claim 1 wherein said bumper engaging means of the bumper hanger includes a first reversely curved hook portion integral with said one end of each shank and defining an acute included angle therewith for engaging the edge of a flangless bumper; a second hook portion integral with the distal end of the first hook portion and extending therefrom in a direction generally perpendicular to the shank portion of the bumper hanger for engaging the forward edge of a flanged bumper; and a third hook portion integral with the distal end of second hook portion and extending therefrom in a direction at an acute included angle with the shank portion.

5. The combination of claim 1 wherein said bumper engaging means of said bumper hanger includes a bumper engaging leg integral with said one end of each shank and extending generally perpendicular thereto and having threads adjacent the distal end thereof, a pair of eye bolts each having an elongated shank and an eye at one end adapted to receive the distal end of the bumper engaging leg of a respective bumper hanger, and means including a second bumper post clamp for securing the other end of each of the eye bolts to the bumper post at a location spaced from the first mentioned bumper post clamp.

6. In a bumper mounted carrier rack of the type including a member adapted to overlie the outer side of the bumper, a first bumper hanger including an L-shaped bolt having an elongated shank and a bumper engaging leg integral with one end of the shank and extending transverse thereto and terminating in an external threaded portion, a second bumper hanger having an elongated shank and an eye integral with one end thereof for receiving the externally threaded end portion of said bumper engaging leg, means threaded on the threaded end portion of said bumper engaging leg of said first bumper hanger for adjusting the eye of said second hanger therealong, the shanks of the first and second bumper hangers each having threads on the other ends thereof and means threadedly adjustable thereon and engaging said member for clamping the member against the outer side of the bumper.

7. In a bumper mounted carrier rack of the type including a tubular member adapted to overlie the outer side of the bumper, upper and lower bumper clamps each including a plate portion having a hole dimensioned to receive said tubular members; a flange portion extending transverse to the plate portion along one edge of the latter; and a lip portion extending laterally of the flange portion and spaced from the plate portion to engage the side of the tubular member, the flange portion of each bumper clamp having a pair of bolt receiving openings adjacent relatively opposite sides of the hole in the plate portion; a first bumper hanger including a pair of L-shaped bolts each including first and second legs integrally connected at one end to extend transverse to each other and having threaded end portions at the other ends thereof, a second bumper hanger including a pair of eye bolts each having an elongated shank with an eye at one end dimensionsed to receive one of the legs of an L-shaped bolt and a threaded end portion at the other end thereof, the threaded end portion on the first legs of the L-shaped bolts extending through respective ones of the bolt receiving openings on one of the bumper clamps and having threaded fasteners thereon for adjusting that bumper clamp horizontally, the threaded end portions on the second legs of the L-shaped bolts extending through the eyes on respective ones of the eye bolts and having threaded fasteners thereon for adjusting the eye bolts vertically, and the threaded end portions of eye bolts extending through respective ones of the bolt receiving openings in the other of the bumper clamps and having threaded fasteners thereon for adjusting that bumper clamp horizontally.

* * * * *